United States Patent
Hayward

(10) Patent No.: US 7,783,716 B2
(45) Date of Patent: Aug. 24, 2010

(54) SYSTEMS AND METHODS FOR IMPLEMENTING CONTENT SENSITIVE ROUTING OVER A WIDE AREA NETWORK (WAN)

(75) Inventor: Geoff Hayward, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 941 days.

(21) Appl. No.: 11/261,943

(22) Filed: Oct. 28, 2005

(65) Prior Publication Data

US 2006/0107100 A1 May 18, 2006

Related U.S. Application Data

(62) Division of application No. 10/302,716, filed on Nov. 22, 2002, now Pat. No. 7,194,656.

(60) Provisional application No. 60/333,996, filed on Nov. 28, 2001.

(51) Int. Cl.
 *G06F 15/167* (2006.01)
 *G06F 15/16* (2006.01)
 *G06F 13/00* (2006.01)

(52) U.S. Cl. .............. 709/213; 709/217; 711/114; 711/148

(58) Field of Classification Search .......... 709/214
 See application file for complete search history.

(56) References Cited

U.S. PATENT DOCUMENTS

| | | | |
|---|---|---|---|
| 5,535,035 A * | 7/1996 | DeFoster et al. ............ 398/3 |
| 6,073,218 A * | 6/2000 | DeKoning et al. .......... 711/150 |
| 6,148,414 A | 11/2000 | Brown et al. |
| 6,330,643 B1 * | 12/2001 | Arimilli et al. ............. 711/141 |
| 6,643,795 B1 | 11/2003 | Sicola et al. |
| 2002/0188655 A1 | 12/2002 | Brown et al. |
| 2003/0236954 A1 | 12/2003 | Keohane et al. |
| 2005/0022052 A1 | 1/2005 | Moulton et al. |
| 2005/0091221 A1 | 4/2005 | Harris et al. |
| 2005/0246393 A1 | 11/2005 | Coates et al. |

FOREIGN PATENT DOCUMENTS

WO  WO 98/28685 A1  7/1998

* cited by examiner

*Primary Examiner*—Joseph E Avellino
*Assistant Examiner*—Afshawn Towfighi
(74) *Attorney, Agent, or Firm*—BainwoodHuang

(57) ABSTRACT

Systems and methods for optimizing storage network functionality. The methods and systems of the present invention are particularly useful for optimizing storage network performance for cases in which some components of the network may be separated by significant distances and/or which include communication links with relatively limited bandwidth. In certain aspects, the present invention provides methods and systems for implementing access to and management of geographically distributed storage resources through multiple peer-to-peer storage network array management functions (AMFs) that may also be geographically distributed. The methods and systems of the present invention, in certain aspects, provide geographically aware cache sharing, cache replication, cache coherence, traffic routing, redundancy group structure, source and destination selection, prefetching of data, message gathering and other useful features.

20 Claims, 4 Drawing Sheets

Configuration for content sensitive routing.

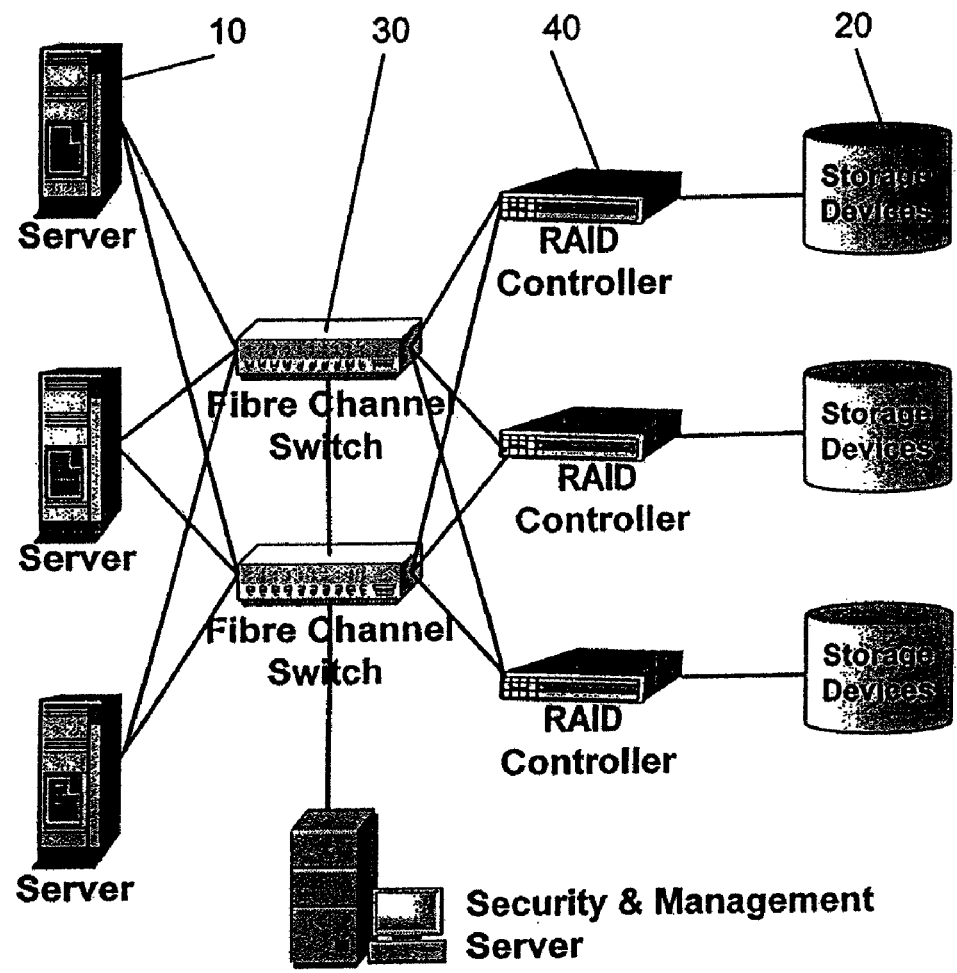
Figure 1: *Conventional Storage Area Network Architecture*
PRIOR ART

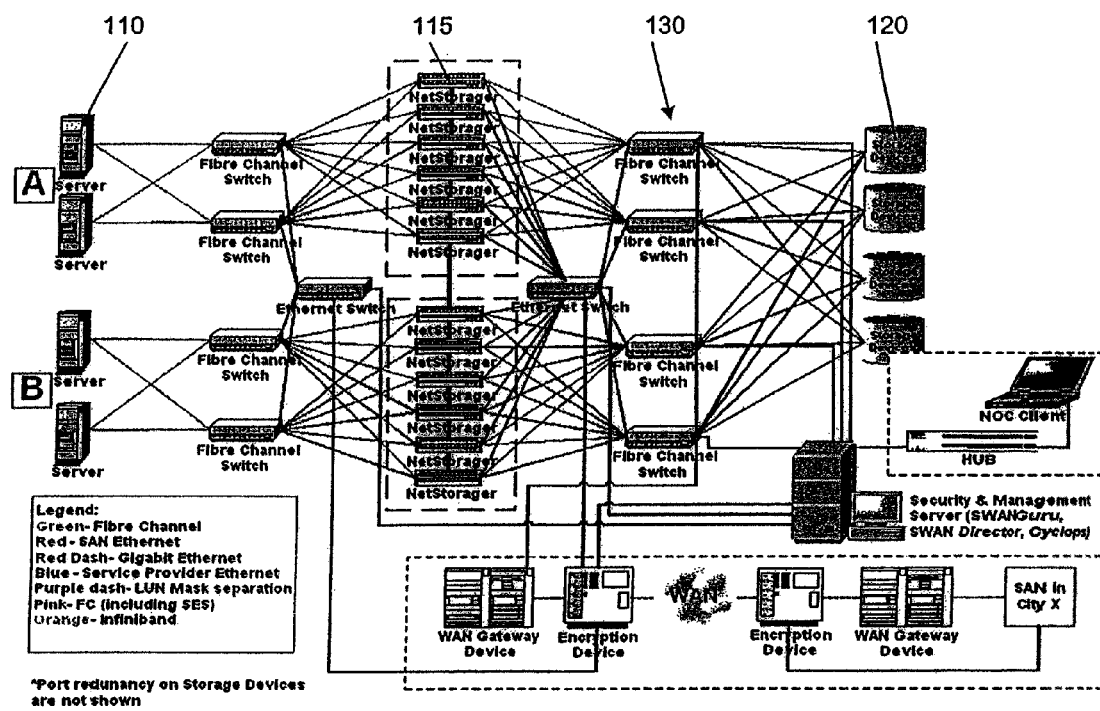
Figure 2: *Storage network in which access and management of a given RG are shared by multiple AMFs operating in a peer-to-peer distributed architecture.*
PRIOR ART

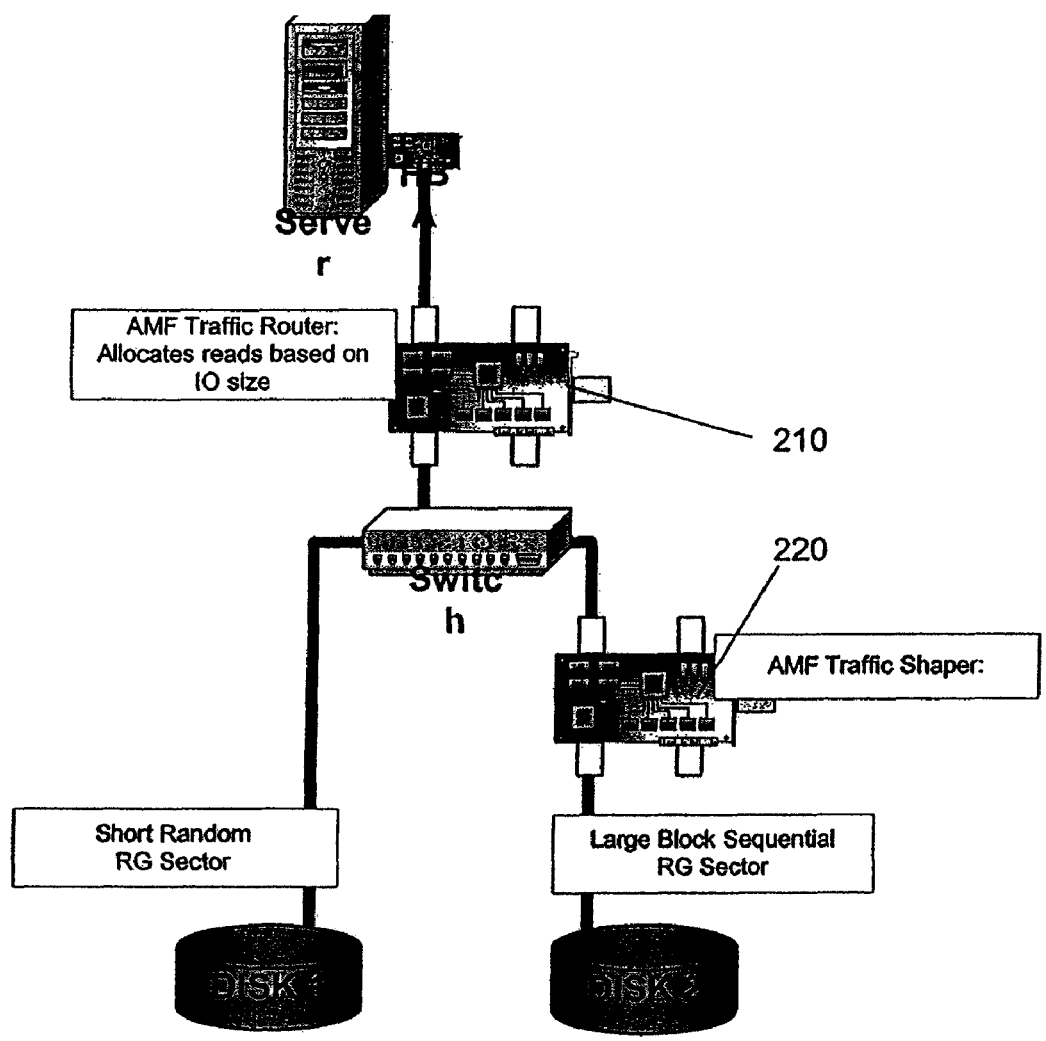
Figure 3: Configuration for content sensitive routing.

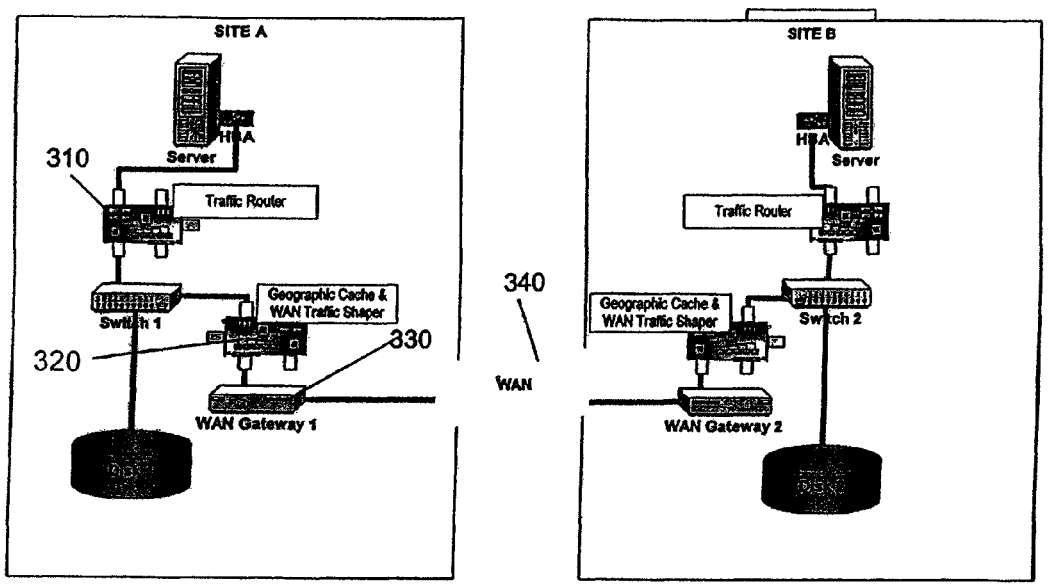
Figure 4: Configuration for geographic caching and geographic sensitive routing

SYSTEMS AND METHODS FOR IMPLEMENTING CONTENT SENSITIVE ROUTING OVER A WIDE AREA NETWORK (WAN)

CROSS-REFERENCES TO RELATED APPLICATIONS

This application is a divisional of U.S. Pat. application Ser. No. 10/302,716 filed Nov. 22, 2002 now U.S. Pat. No. 7,194,656 entitled "SYSTEMS AND METHODS FOR IMPLEMENTING CONTENT SENSITIVE ROUTING OVER A WIDE AREA NETWORK (WAN)". Additionally, this application claims the benefit of U.S. Provisional Patent Application Ser. No. 60/333,996, filed Nov. 28, 2001 and entitled "SYSTEMS AND METHODS FOR IMPLEMENTING CONTENT SENSITIVE ROUTING OVER A WIDE AREA NETWORK (WAN)", which is hereby incorporated by reference in its entirety.

BACKGROUND OF THE INVENTION

The present invention relates generally to storage networks, and more particularly to systems and methods for optimizing performance in networks including geographically remote components and/or limited bandwidth connection links.

An increasingly globalized economy results in pressure for organizations to share resources. And, in an era when information is one of the most valuable resources an organization possesses, sharing electronic data storage is becoming an imperative. The sharing may need to occur between multiple sites of a single organization, or between different organizations that share common objectives, or between organizations that share nothing in common except the desire to purchase reliable and inexpensive data storage from a third party.

Opportunities for organizations that can efficiently share storage resources include:

1. Reduced transactional latency: In many applications, a single data transaction can initiate a cascade of tens or even hundreds of other automated data transactions. Since transcontinental and intercontinental transport for a single transaction results in latencies of a tenth of a second or more, cumulative transport latency can easily become unacceptable. Consequently, storing data close to the businesses and customers that need it when they need it makes good sense.
2. Improved storage management: Increasingly, an important bottleneck to scaling storage networks is the lack of skilled storage management professionals. If the storage resources of the multi-site network can be accessed and managed by controller subsystems at any given site, significant savings would result.
3. Improved availability and business continuity: If a storage subsystem from any given site can compensate for failures that occur in sister subsystems at other sites, the extended network can achieve greater fault tolerance at less expense. Also, in the event of a disaster affecting any single site, it is important that the other sites be able to compensate seamlessly without any disruption to their normal operation except that they must handle a greater workload.
4. Reduced congestion and improved performance: Centralized storage can create an unnecessary bottleneck in data distribution. This is particularly true of data centers devoted to applications involving large block sequential content (e.g., video-on-demand applications).
5. Improved use of corporate resources: Centralized storage often fails to exploit the existing network and storage resources of multi-site organizations. Also, it is often valuable for the geographic distribution of storage to mirror the geographic distribution of business units within a company.

Unfortunately, most organizations are not able to realize these opportunities because of limitations inherent to conventional storage network architectures.

FIG. 1 shows an example of a logical layout for a conventional storage area network (SAN). In this example, application servers 10 are connected through a Fibre Channel (FC) fabric to an array of storage devices 20. In this case, FC switches 30 provide any-to-any connectivity between the servers 10 and logical storage devices 20, each of which might, for example, represent an array of disks. A Redundant Array of Independent Disk (RAID) controller 40 manages each logical storage device 20 in FIG. 1. The RAID controller function shown in the FIG. 1 is meant to represent a logical controller function that may be implemented in software, hardware, or some combination of both. The RAID controller function is a special case of an Array Management Function (AMF). The array of storage devices managed by-a given AMF is known as "Redundancy Group" (RG). In general, the AMF is responsible for access and management of one or more RGs.

"Array Management Function" (AMF) generally refers to the body that provides common control and management for one or more disk or tape arrays. An AMF presents the arrays of tapes or disks it controls to the operating environment as one or more virtual disks or tapes. An AMF typically executes in a disk controller, an intelligent host bus adapter or in a host computer. When it executes in a disk controller, an AMF is often referred to as firmware. One or more AMFs can execute in each controller, adapter or host as desired for the particular application.

"Redundancy Group" (RG) generally refers to a collection of logical or physical storage entities organized by an AMF for the purpose of providing data protection. Within a given RG, a single type of data protection is used. All the user data storage capacity in a RG is protected by check data stored within the group, and no user data capacity external to a RG is protected by check data within it. RGs typically include logical entities composed of many resources such as stripes, data blocks, cached data, map tables, configuration tables, state tables, etc.

"Redundancy Group Management" generally refers to the responsibilities, processes and actions of an AMF associated with a given redundancy group.

While there are many variants on the typical SAN architecture shown in FIG. 1, one element of note here is that each RG is managed by only one AMF. This AMF is said to be the "logical owner" of the given RG.

An important consequence is that when an AMF fails, users lose access and control of the RGs for which it had ownership. Some conventional storage network architectures address this problem by having responsibility for RGs transfer to new AMFs in the event of a failure of their logical owner. Other Storage networking systems employ a "Master/Slave" architecture in which two or more AMFs may have access to a given storage array, however, changes to the storage array (e.g., writing of data, re-build of a failed disk, expansion of the array, etc.) are managed exclusively through the "Master" AMF.

When a storage network is implemented in a multi-site configuration, additional constraints imposed by the "Master/Slave" architecture for RG management become apparent.

Suppose, for instance, that a given RG is composed of storage resources from two sites. Unless the Master AMF is "geographically aware", read requests may be routed to remote storage resources even when the requisite data is available locally. The result is unnecessary penalties in terms of response time, performance, and wide area bandwidth usage. Also, suppose that users at the remote site wish to perform write operations or control and management functions on the RG that are reserved for the Master AMF. Traffic associated with these functions must be routed through the remote site, again resulting in unnecessary penalties for local users.

Typically, in multi-site storage networks using the Master/Slave architecture for RG management, the remote mirrors of a logical volume within a redundancy group are necessarily 'read-only' unless the primary logical volumes fail. Geographically distributed RGs are, in fact, only providing passive remote mirrors to primary data stored locally. Such systems typically do not allow the user to mount RGs that might include primary storage at multiple sites, striping across multiple sites, or even primary storage that is entirely remote from the site at which the Master AMF resides.

U.S. Pat. No. 6,148,414, which is hereby incorporated by reference in its entirety, describes a novel storage networking architecture in which multiple AMFs maintain peer-to-peer access of shared RGs.

FIG. 2 shows a sample network configuration incorporating multiple AMFs in which the teachings of U.S. Pat. No. 6,148,414 may be implemented. A plurality of network clients (not shown) is communicably coupled with a plurality of servers 110, each of which is, in turn, coupled to a plurality of AMFs (resident in the AMF Blades or "NetStorager" cards 115 as shown in FIG. 2). These AMFs (resident on blades 115) are, in turn, connected though a switch fabric 130 to a plurality of storage resources 120.

In the architecture of FIG. 2, the AMFs provide concurrent access to the redundancy groups for associated host systems. When a host (e.g., network client device or server 110) requests an AMF to perform an operation on a resource, the AMF synchronizes with the other AMFs sharing control of the redundancy group that includes the resource to be operated on, so as to obtain a lock on the resource. While performing the operation, the AMF sends replication data and state information associated with the resource to the other AMFs sharing control of the redundancy group such that if the AMF fails, any of the other AMFs are able to complete the operation and maintain data reliability and coherency.

Another key element of the storage network architecture described by U.S. Pat. No. 6,148,414 is that multiple AMFs not only share access to a given RG, they also share management of it as peers. So, for-example, the architecture incorporates an algorithm by which multiple AMFs arbitrate for responsibility to reconstruct the redundancy group when one of its disks fails. Also, the architecture includes an algorithm by which a redundancy group can be expanded to include an additional disk, for example.

Such systems, however, tend to be insensitive to the geographic location of the various components of the storage network. It is therefore desirable to provide systems and methods to optimize storage network functionality for cases in which some components of the network may be separated by significant distances and/or which include communication links with relatively limited bandwidth.

BRIEF SUMMARY OF THE INVENTION

The present invention provides systems and methods for optimizing storage network functionality. In particular, the methods and systems of the present invention are particularly useful for optimizing storage network performance for cases in which some components of the network may be separated by significant distances and/or which include communication links with relatively limited bandwidth. In certain aspects, the present invention provides methods and systems for implementing access to and management of geographically distributed storage resources through multiple peer-to-peer storage network array management functions (AMFs) that may also be geographically distributed. The methods and systems of the present invention, in certain aspects, provide geographically aware cache sharing, cache replication, cache coherence, traffic routing, redundancy group structure, source and destination selection, pre-fetching of data, message gathering and other useful features.

In certain aspects, the present invention provides methods and systems for implementing a storage network in which multiple AMFs that may be physically separated by significant distances (e.g., up to tens of thousands of kilometres or more) can more efficiently manage multiple RGs, each of which may include storage resources that may be physically separate from one another by significant distances (e.g., up to tens of thousands of kilometres or more).

Unlike the methods and systems presented in U.S. Pat. No. 6,148,414, which are generally insensitive to the geographic location of the various components of the storage network, in certain aspects the methods and systems of the current invention are designed specifically to optimize storage network functionality for cases in which some components of the network may be separated by significant distances. The methods and systems of the present invention can also be applied to storage networks in which certain components of the network are connected to certain other components in the network by communication links with relatively limited bandwidth.

Further, it should be noted, that even in the event that neither physical separation nor limitations in bandwidth constrain relations between components of the storage network, many aspects of the present invention differ significantly from those presented in U.S. Pat. No. 6,148,414.

The present invention provides methods and systems that provide geographically and bandwidth aware cache coherence and management, input/output (IO) traffic routing, storage resource selection and configuration, fail-over management, reconstruction management, data transfer management (i.e., from one storage resource to another), RG expansion and contraction management, and message gathering and pre-fetching.

According to the present invention, methods and systems are provided for implementing hierarchical distributed cache sharing in which a proxy node manages communications between LAAGs so as to minimize or eliminate inter-LAAG meta-data traffic on read and write operations.

According to an aspect of the present invention, a system for implementing hierarchical distributed cache coherence in a storage network is provided. The system typically includes a redundancy group (RG) including a first plurality of storage resources and a second plurality of storage resources located remotely from the first plurality of storage resources. The system also typically includes an AMF access group (AAG), including a plurality of AMFs that share read and write access to the RG, wherein the AAG includes two or more local AMF access groups (LAAGs), each LAAG being either remote from other LAAGs or communicably coupled to other LAAGs by a low bandwidth network link. The system also typically includes a proxy node configured to manage communications between the two or more LAAGs so as to minimize or eliminate inter-LAAG meta-data traffic for read and write operations. The proxy node is implemented in one of the plurality of AMFs or as a separate AMF.

According to another aspect of the present invention, a method is provided for implementing hierarchical distributed cache coherence in a storage network that typically includes a redundancy group (RG) including a first plurality of storage resources and a second plurality of storage resources located remotely from the first plurality of storage resources, and an AMF access group (AAG), including a plurality of AMFs that share read and write access to the RG, wherein the AAG includes two or more local AMF access groups (LAAGs), each LAAG being either remote from other LAAGs or communicably coupled to other LAAGs by a low bandwidth network link. The method typically includes receiving a data access request from a host by a first AMF in a first LAAG, sending meta-data related associated with the access request to a second AMF in the LAAG, wherein the second AMF is configured to act as a proxy agent for the LAAG, and sending, from the second AMF, the meta-data to the proxy agent for each of the other LAAGs. The data access request is one of a read request and a write request. The meta-data typically includes, for write requests, write invalidate commands.

Additional aspects of the present invention include a method for implementing preferred target selection for read operations by a given AMF so that the read operations are directed toward data mirrors residing within the nearest LRG, a method for implementing preferred AMF selection, and source mirror selection for rebuild and data transfer operations so that read/write traffic is confined as much as possible to the LRG associated with the target storage resource, a method for implementing preferred target selection for read operations by a given AMF in fail-over scenarios so that these read operations are directed toward the nearest surviving data mirror, a method for implementing preferred target selection for read operations by a given AMF so that these read operations are directed toward data mirrors residing within the nearest LRG, and a method for implementing adaptive geographically aware RAID.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1 shows an example of a logical layout for a conventional storage area network (SAN).

FIG. 2 illustrates a sample network configuration incorporating multiple AMFs.

FIG. 3 illustrates a network configuration according to one embodiment.

FIG. 4 illustrates a network configuration according to one embodiment.

DETAILED DESCRIPTION OF SPECIFIC EMBODIMENTS

Geographic/Bandwidth Sensitive Distributed AMF Cache Coherence

An "AMF Access Group" (AAG) for a particular RG is defined as the set of AMFs that share read/write access to the RG. Similarly, an "AMF Management Group" (AMG) for a particular RG is defined as the set of AMFs that share management of the RG.

In the event that AMFs within the AAG have cache memory, it is necessary to ensure that these caches are kept coherent with one another. Otherwise, read accesses through different AMFs within the AAG might yield inconsistent data sets.

Thus, according to one embodiment, when AMFs within the AAG can be sub-divided into groups by virtue of their physical location or other constraints (e.g., topological or bandwidth constraints) limiting communication, the cache coherence algorithm is modified to establish a hierarchical structure within the AAG. A "Local AMF Access Group" (LAAG) of a given AAG is defined as a sub-group of AMFs that can be distinguished from other AMFs within the AAG by virtue of physical locality at a specific site or by virtue of some other constraint limiting communication with other AMFs within the AAG.

In certain aspects, to more effectively provide cache coherence throughout the AAG, it will frequently be desirable to adopt a different strategy for intra-LAAG cache coherence than for inter-LAAG cache coherence. To this end, a gateway proxy agent P is determined for each LAAG whose responsibility is to manage cache coherence meta-traffic between that LAAG and all others within the AAG. Each gateway proxy agent P is preferably one of the AMFs in the LAAG.

One preferred implementation of a hierarchical cache coherence algorithm of the present invention is as follows:

1. AMF(X) within LAAG(Y) receives from a host server a write update to M consecutive blocks beginning with block N.
2. AMF(X) sends a write invalidate command for blocks N to N+M to all AMFs within LAAG(Y)
3. AMF(X) sends a write invalidate command for blocks N to N+M to the proxy agent P(Y) for LAAG(Y)
4. P(Y) forwards the write invalidate command to the proxy agents for all the other LAAGs within the AAG.
5. Proxy agents for each of the other LAAGs broadcast the write invalidate command to all AMFs within their respective LAAGs.
6. Upon receipt of acknowledgment of successful write invalidates from all AMFs within the LAAG, each proxy agent sends an acknowledgment of successful invalidation to the originating proxy agent P(Y).
7. When P(Y) receives acknowledgments of successful invalidation from all other proxy agents, it forwards an acknowledgment of successful invalidation to AMF(X)
8. Upon receipt of acknowledgments from all other AMFs within LAAG(Y) and receipt of acknowledgement from P(Y), AMF(X) writes the new data to local cache.
9. AMF(X) sends acknowledgment of successful write to the host server.

Another preferred implementation for a distributed "cache coherence" algorithm is simply for each AMF to by-pass its cache (or invalidate its cache) for block ranges within RGs having AAGs with more than one LAAG.

The value of this strategy is that the cache resources of the AMF are reserved for block ranges that are accessed only by 'local' AMFs. This results in greater locality of reference and improved cache-hit performance.

It is understood that several other distributed cache coherence algorithms are possible that will have advantages for certain traffic profiles in minimizing inter-LAAG communication (e.g., write updates within the LAAG and write invalidates between LAAGs, directory based schemes which employ local directories, etc.). One feature that differentiates the family of distributed cache coherence architectures described herein is that they typically employ a proxy agent responsible for inter-LAAG communication of cache coherence meta-data.

Geographically Aware Distributed Cache Sharing

If the AAG for a given block range includes more than one LAAG, there is the risk of wasting bandwidth for remote cache read requests. More precisely, the risk is that when a local AMF discovers that a given page is not in his own cache it will request the page from the cache of a AMF in a different LAAG. This may be a poor gamble for a host or reasons including:

- By virtue of locality of reference, the page is much less likely to be in the geographically remote AMF's cache.
- The additional transport latency of accessing remote cache reduces the potential "win" of a remote cache hit.
- Whether or not it is successful, the request for the page from remote cache is wasteful of the wide area bandwidth.

According to one embodiment, to overcome the problem, the cache sharing group for each AMF is configured so that it is limited to the LAAG.

Several different strategies for distinguishing the new group structure are possible. One preferred implementation is to maintain cache-sharing within the LAAG on read operations but prohibit cache sharing between LAAGs. The sequence on read operations in one embodiment is as follows:

1. AMF(X) receives a read request for a given block range
2. AMF(X) consults his local cache and, if the data is there, serves it to host,
3. In the event that the required blocks are not in the local cache of AMF(X), it initiates a request for the blocks to a local directory which mediates a data transfer from cache another AMF within the LAAG if possible.
4. In the event that the required blocks are not in cache of an AMF within the LAAG, AMF(X) retrieves the data from the RG.

It is understood that several other distributed cache sharing algorithms are possible that will have advantages for certain traffic profiles in minimizing inter-LAAG communication. One feature that differentiates the family of distributed cache sharing architectures discussed herein is that they either employ a proxy agent responsible for inter-LAAG communication of cache sharing meta-data or prohibit inter-LAAG cache sharing entirely.

Geographically Aware AMF Target Fail-over

In configurations for which an AAG is composed of multiple LAAGs and in which the RG includes multiple Local Redundancy Groups (LRGs) each of which includes a mirror of the primary data for the RG, it is desirable to implement a strategy by which read operations are directed preferentially to the LRG for each AMF.

One preferred implementation is to introduce a parameter in the function of the AMF that selects targets for read operations such that one AMF target for mirrored read operations is preferred over the others. In configurations having multiple LAAGs, the preferred target for read operations should be configured so that each AMF preferentially reads from storage resources that are within its LRG.

On write operations, to ensure data coherence between the LRGs it is necessary to write data to all mirrors within the RG. In a preferred implementation, write operations are conducted synchronously and acknowledgment of a successful write is sent to the host once all mirrors within the RG have acknowledged successful writes back to the initiating AMF.

Furthermore, in a preferred implementation, each AMF has a hierarchy of preferred targets so that if the primary target fails, read operations are preferentially targeted to surviving mirrors within the LRG.

Similarly, for RG 'reconstruction' and block-level data transfer scenarios (e.g. disk-level rebuild, partition-level rebuild, disk-level copy, partition-level copy, etc.), it is desirable to ensure maximal localization of data transfer. Consider the example of a geographically distributed RAID 1 in which there are mirrors at both Site A and Site B. Also, suppose that the redundancy group is exported through AMFs at both sites. Now, suppose one of the mirrors at Site A requires a rebuild. Since the algorithm that selects an AMF to take charge of the reconstruction operation is unaware of physical location, the perverse situation can arise in which an AMF at Site B mediates a rebuild between two disks at Site A. By changing the reconstruction algorithm so that a preferred AMF can be nominated to mediate a given reconstruction operation it is ensured that minimal disk reconstruction traffic proceeds over the WAN in the event of disk failure. Using this new feature in conjunction with the ability of the AMFs to select a preferred target for read operations, excellent localization of data transfer for reconstruction operations can be ensured.

Geographically Aware Traffic Routing

Enabling "content sensitive routing" and geographically aware routing could significantly improve performance both in single site implementations and multi-site implementations. Below, a method for achieving content sensitive routing is discussed.

Consider the configuration of FIG. 3. Note that two AMFs are involved, the "Traffic Router" 210 and the "Traffic Shaper" 220. To understand the roles of these AMFs, certain aspects of the processing of write operations and read operations will be considered in turn.

For Write Operations:

1. The first AMF in the data path from the host—the Traffic Router 210—performs normal RAID 1 write operations. From its perspective, the targets for its mirrored writes are Disk 1 and another AMF (the Traffic Shaper 220).
2. The Traffic Shaper 220 also performs normal AMF write operations, however, its configuration is optimized for large block sequential traffic. For example, in one embodiment, the Traffic Shaper220 is configured with an AMF page size that is much larger than that of the Traffic Router 210. Also, it can be configured in write-back mode and flush its dirty data to disk much less frequently than the Traffic Router 210 does.
3. The configuration of logical Disk 2 is also optimized for large block sequential traffic. For example, in one embodiment, Disk 2 corresponds to a RAID 0 redundancy group with striping over a large number of disks and with a relatively large stripe depth. Also, the configuration of the disk cache for logical Disk 2 is preferably optimized for large sequential traffic.
4. By contrast, the configuration of logical Disk 1 is optimized for short, random traffic.

Of course, despite the 'optimizations' described above, all writes—whether they are long or short—are preferably mirrored to logical disks 1 and 2. Consequently, the advantages of the proposed configuration for write operations may not be all that great. Even so, if the Traffic Router 210 is configured to acknowledge a successful write to host after it has received acknowledgment from just one of its targets, and the Traffic Shaper 220 is configured in write-back mode, the user should experience a good combination of fault tolerance and write performance (e.g., a successful write is acknowledged to host upon a successful write to the caches of both the Traffic Router 210 and the Traffic Shaper 220). As another example, suppose the Traffic Router 210 is configured to acknowledge a successful write to host after it has itself received acknowledgement of a successful write from one of its targets and further suppose the Traffic Shaper 220 is configured in a write-through mode. The user will still experience a reduction in latencies on write operations since, regardless of whether the write is long or short, one or the other of the targets will acknowledge a successful write sooner than would otherwise be the case.

For Read Operations:
1. The Traffic Router 210 receives a read request from a host through one of its FC ports.
2. The VDP forwards the request to local cache and, if the required pages are in cache, they are served to the host.
3. If the required pages are not in local cache, the request is forwarded to the AMF.
4. At this stage, a modification in the software tower is implemented. In the typical implementation of the software tower, the VDP decomposes the read request into AMF pages of fixed size and the VDP does not pass to the AMF information about the size of the original read request. According to one embodiment, the AMF applies a test condition to the size of the original read request. In this embodiment, AMF pages spawned by read requests larger than a threshold are preferentially scheduled to the Traffic Shaper target 220, and smaller read requests are preferentially forwarded to logical Disk 1.
5. The Traffic Shaper 220 is an ordinary AMF, however, its configuration is optimized for large block sequential traffic. In particular, Traffic Shaper 220 preferably includes a much larger AMF page size than the Traffic Router 210. Also, the "Prefetch" feature is preferably turned on.
6. The configuration of logical Disk 2 should be optimized for large block sequential traffic. For instance, logical Disk 2 might correspond to a RAID 0 RG with a large number of disks and a large stripe depth. Also, the "Prefetch" feature of each of the disk caches should be turned on. In principle, even the physical disks themselves might be selected based on their ability to provide high performance for large block sequential reads.
7. Logical Disk 2 should be configured to perform best for short read operations.

In the event of failure of either logical Disk 1 or Disk 2, the AMF of the Traffic Router 210 schedules all reads (regardless of their length) to the surviving disk.

Several other possible implementations of this strategy follow directly. For instance, the caching policy of Traffic Router 210 in one embodiment is altered so that it does not retain cache pages forwarded to it from the Traffic Shaper 220. This helps provide better locality of reference in each cache and, hence, better cache performance.

Adaptive Geographic RAID 5

According to one embodiment, a distributed RAID1 configuration is implemented. At some later time (e.g., triggered by a Hierarchical Storage Management (HSM) policy) the remote mirror migrates to a geographically distributed RAID 3, RAID 5, or RAID 6. For instance, upon triggering by the HSM policy, stripes of a given remote RAID 1 mirror are sent to other sites. Each site that receives a stripe of this data uses it to modify parity data representing primary data from other remote sites. In principle, the original remote mirror could then be destroyed while retaining disaster tolerance.

Suppose, for instance, that five sites adaptively send parity from their primary data in this fashion. Should any of the five sites lose data, they could reconstruct that data through XOR operations between the parity data and the surviving primary data from the other four sites.

Geographic Caching/Geographic Sensitive Routing

Geographic sensitive routing can also be achieved through a version of the above strategy. Consider the network configuration shown in FIG. 4. The WAN gateway 330 is configured so that it has its best performance for large block sequential traffic. It may therefore be valuable to use the content sensitive routing strategy mentioned above to "shape" traffic going over the wide area link. On write operations, one might choose a write update policy in the WAN Traffic Shaper 320 that accumulates a large amount of dirty data before flushing to remote disk (e.g., semi-synchronous or asynchronous writing to remote disk). Also to better utilize the available bandwidth, only larger block sequential reads should be scheduled for the wide area link and the AMF page size in the WAN Traffic Shaper 320 should be configured to be unusually large. Further, by turning the pre-fetch feature on in the WAN Traffic Shaper 320, wide area transport latency can be masked from the user (i.e., geographic pre-fetch).

In the event that the SWAN configuration is such that remote data is not stored on local disk (as will frequently be the case for multi-site SWANs), the WAN Traffic Shaper 320 also can play the role of a "geographic cache". By ensuring that its disk-side ports are only connected to the WAN gateway 330, it is ensured that all data in its cache is associated with remote storage (i.e., geographic caching). The geographic cache can be used to mask transport latency from the user.

Geographically Sensitive Cache Sharing

If the cache sharing group for a given block range includes AMFs that are separated over geography, there is the risk of wasting bandwidth for remote cache read requests. More precisely, the risk is that when a local AMF discovers that a given page is not in his own cache it will request the page from the cache of a geographically remote AMF. This may be a poor gamble for a host or reasons including:

By virtue of locality of reference, the page is much less likely to be in the geographically remote AMF's cache.

The additional transport latency of accessing remote cache reduces the potential "win" of a remote cache hit.

Whether or not it is successful, the request for the page from remote cache is wasteful of the wide area bandwidth.

According to one embodiment, to overcome the problem, the cache sharing group for each AMF is configured so that it does not include geographically remote AMFs.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for implementing hierarchical distributed cache coherence in a storage network, the system comprising:
   a redundancy group (RG) including a first plurality of storage resources and a second plurality of storage resources located remotely from the first plurality of storage resources;
   an array management function (AMF) access group (AAG), including a plurality of AMFs that share read and write access to the RG, wherein the AAG includes two or more local AMF access groups (LAAGs), each LAAG being either remote from other LAAGS or communicably coupled to other LAAGs by a low bandwidth network link; and a proxy node configured to manage communications between the two or more LAAGs so as to minimize or eliminate inter-LAAG meta-data traffic for read and write operations;

wherein the AMF access group includes:

a set of first array management function devices forming a first LAAG which is constructed and arranged to access a redundancy group of first storage resources, and a set of second array management function devices forming a second LAAG which is constructed and arranged to access a redundancy group of second storage resources, the first array management function devices being separate and distinct from the second array management function devices, and the first storage resources being separate and distinct from the second storage resources;

wherein a particular first array management function device is constructed and arranged to operate as a proxy node of the first LAAG;

wherein a particular second array management function device is constructed and arranged to operate as a proxy node of the second LAAG;

wherein the proxy node of the first LAAG is constructed and arranged to exchange cache coherency communications with the proxy node of the second LAAG; and wherein the proxy node of the first LAAG has a local cache; and wherein the proxy node of the first LAAG is constructed and arranged to:

receive a write invalidate command signal from a first array management function device of the first LAAG, invalidate particular blocks of the local cache of the proxy node of the first LAAG, send a command message to the proxy node of the second LAAG directing the proxy node of the second LAAG to inform all of the second array management function devices to invalidate particular blocks of their local caches, the particular blocks of their local caches corresponding to the particular blocks of the local cache of the proxy node of the first LAAG; and receive a reply message from the proxy node of the second LAAG indicating that the proxy node of the second LAAG has confirmed that all of the second array management function devices have invalidated the blocks of their local caches in response to the command message.

2. The system of claim 1, wherein each proxy node is implemented in one of the plurality of AMFs or as a separate AMF.

3. The system of claim 1, wherein each first array management function device is constructed and arranged to coordinate cache coherency with other first array management function devices in accordance with a local cache coherency protocol;

wherein each second array management function device is constructed and arranged to coordinate cache coherency with other second array management function devices in accordance with the local cache coherency protocol; and wherein the proxy nodes of the first and second LAAGs are constructed and arranged to coordinate cache coherency between the first and second LAAGs in accordance with a remote cache coherency protocol which is different than the local cache coherency protocol.

4. The system of claim 3, wherein bandwidth demand between two array management function devices in accordance with the local cache coherency protocol is higher than bandwidth demand between the proxy nodes of the first and second LAAGs in accordance with the remote cache coherency protocol.

5. The system of claim 1, wherein the proxy node of the first LAAG is further constructed and arranged to:

send a response signal to the first array management function device of the first LAAG to report completion of block invalidation in response to the write invalidate command signal.

6. The system of claim 1 wherein the first LAAG has first storage control devices and first communications links connecting the first storage control devices together;

wherein the second LAAG has second storage control devices and second communications links connecting the second storage control devices together; and wherein the low bandwidth network link connects a particular first storage control device of the first LAAG with a particular second storage control device of the second LAAG, each of the first and second communications links being constructed and arranged to provide a higher bandwidth than that of the low bandwidth network link which connects the particular first storage control device of the first LAAG with the particular second storage control device of the second LAAG.

7. The system of claim 6 wherein the first storage control devices of the first LAAG reside at a first location;

wherein the second storage control devices of the second LAAG reside at a second location, the first and second locations being geographically separated by at least a thousand kilometers;

wherein the particular first storage control device of the first LAAG is constructed and arranged to send write invalidation commands to the particular second storage control device of the second LAAG through the low bandwidth network link on behalf of the first LAAG in response to write operations received from a particular host which is locally connected to the first LAAG; and wherein the particular second storage control device of the second LAAG is constructed and arranged to distribute the write invalidation commands from the particular first storage control device to other second storage control devices of the second LAAG through the second communications links.

8. The system of claim 7 wherein the proxy node is constructed and arranged to process inter-LAAG meta-data traffic for read and write operations between one of the first and second LAAGs and another LAAG.

9. The system of claim 1 wherein the proxy node of the first LAAG, when receiving the write invalidate command signal from the first array management function device of the first LAAG, is constructed and arranged to:

obtain the write invalidate command signal through a first communications medium connecting the proxy node of the first LAAG to the first array management function device of the first LAAG;

wherein the proxy node of the first LAAG, when sending the command message to the proxy node of the second LAAG, is constructed and arranged to:

transmit the command message to the proxy node of the second LAAG through a second communications medium connecting the proxy node of the first LAAG to the proxy node of the second LAAG; and wherein the bandwidth of the second communications medium is substantially lower than the bandwidth of the first communications medium.

10. The system of claim 9, wherein the second LAAG includes multiple AMF devices; and wherein the command message transmitted to the proxy node of the second LAAG is constructed and arranged to direct the proxy node of the second LAAG to locally broadcast a write invalidate command to all of the multiple AMF devices of the second LAAG.

11. The system of claim 10 wherein the proxy node of the first LAAG is further constructed and arranged to:
in response to transmitting the command message to the proxy node of the second LAAG through the second communications medium, receive an acknowledgement of successful invalidation from the proxy node of the second LAAG through the second communications medium, the acknowledgement indicating that the proxy node of the second LAAG has received acknowledgement of successful write invalidations from all of the multiple AMF devices of the second LAAG in response to locally broadcasting the write invalidate command by the proxy node of the second LAAG.

12. A method for implementing hierarchical distributed cache coherence in a storage network, the network comprising a redundancy group (RG) including a first plurality of storage resources and a second plurality of storage resources located remotely from the first plurality of storage resources, and an array management function (AMF) access group (AAG), including a plurality of AMFs that share read and write access to the RG, wherein the AAG includes two or more local AMF access groups (LAAGs), each LAAG being either remote from other LAAGS or communicably coupled to other LAAGs by a low bandwidth network link, the method comprising:
receiving a data access request from a host by a first AMF in a first LAAG;
sending meta-data associated with the access request to a second AMF in the LAAG, wherein the second AMF is configured to act as a proxy agent for the LAAG; and
sending, from the second AMF, the meta-data to the proxy agent for each of the other LAAGs;
wherein the AMF access group includes:
a set of first array management function devices forming a first LAAG which is constructed and arranged to access a redundancy group of first storage resources, and
a set of second array management function devices forming a second LAAG which is constructed and arranged to access a redundancy group of second storage resources, the first array management function devices being separate and distinct from the second array management function devices, and the first storage resources being separate and distinct from the second storage resources;
wherein the method further comprises:
the first array management function devices forming the first LAAG performing read and write operations on the first storage resources, and
the second array management function devices forming the second LAAG performing read and write operations on the second storage resources;
wherein a particular first array management function device is constructed and arranged to operate as a proxy node of the first LAAG;
wherein a particular second array management function device is constructed and arranged to operate as a proxy node of the second LAAG;
wherein the method further comprises exchanging cache coherency communications between the proxy node of the first LAAG and the proxy node of the second LAAG;
wherein the proxy node of the first LAAG has a local cache; and
wherein the method further comprises:
receiving, by the proxy node of the first LAAG, a write invalidate command signal from a first array management function device of the first LAAG,
invalidating, by the proxy node of the first LAAG, particular blocks of the local cache of the proxy node of the first LAAG,
sending, by the proxy node of the first LAAG, a command message to the proxy node of the second LAAG directing the proxy node of the second LAAG to inform all of the second array management function devices to invalidate particular blocks of their local caches, the particular blocks of their local caches corresponding to the particular blocks of the local cache of the proxy node of the first LAAG, and
receiving, by the proxy node of the first LAAG, a reply message from the proxy node of the second LAAG indicating that the proxy node of the second LAAG has confirmed that all of the second array management function devices have invalidated the blocks of their local caches in response to the command message.

13. The method of claim 12, wherein the data access request is a request to read data from a RG.

14. The method of claim 12, wherein the data access request is a request to write data to a RG.

15. The method of claim 14, wherein the meta-data includes a write invalidate command.

16. The method of claim 12, wherein each first array management function device is constructed and arranged to coordinate cache coherency with other first array management function devices in accordance with a local cache coherency protocol;
wherein each second array management function device is constructed and arranged to coordinate cache coherency with other second array management function devices in accordance with the local cache coherency protocol; and
wherein the method further comprises coordinating, by the proxy nodes of the first and second LAAGs, cache coherency between the first and second LAAGs in accordance with a remote cache coherency protocol which is different than the local cache coherency protocol.

17. The method of claim 16, wherein bandwidth demand between two array management function devices in accordance with the local cache coherency protocol is higher than bandwidth demand between the proxy nodes of the first and second LAAGs in accordance with the remote cache coherency protocol.

18. The method of claim 12, further comprising:
sending, by the proxy node of the first LAAG, a response signal to the first array management function device of the first LAAG to report completion of block invalidation in response to the write invalidate command signal.

19. A storage system, comprising:
first storage resources arranged as a first redundancy group;
a set of first array management function devices forming a first local access group which is constructed and arranged to perform read and write operations on the first storage resources, a particular first array management function device being constructed and arranged to operate as a proxy node of the first local access group;
second storage resources arranged as a second redundancy group; and
a set of second array management function devices forming a second local access group which is constructed and arranged to perform read and write operations on the second storage resources, a particular second array management function device being constructed and arranged to operate as a proxy node of the second local access group;

the proxy node of the first local access group having a local cache and being constructed and arranged to: (i) receive a write invalidate command signal from a first array management function device of the first local access group, (ii) invalidate blocks of the local cache of the proxy node of the the first local access group, (iii) send a command message to the proxy node of the second local access group directing the proxy node of the second local access group to inform all of the second array management function devices to invalidate particular blocks of their local caches, the particular blocks of their local caches corresponding to the particular blocks of the local cache of the proxy node of the first local access group, and (iv) receive a reply message from the proxy node of the second LAAG indicating that the proxy node of the second LAAG has confirmed that all of the second array management function devices have invalidated the blocks of their local caches in response to the command message;

wherein first communications links connect the first array management function devices together;

wherein second communications links connect the second array management function devices together; and wherein a low bandwidth network link connects the particular first array management function device to the particular second array management function device to provide communications between the first local access group and the second local access group, each of the first and second communications links being constructed and arranged to provide higher bandwidth than that of the low bandwidth network link, the first local access group and the second local access group being separated by at least a thousand kilometers.

20. A storage system as in claim 19 wherein the proxy node of the first local access group is further constructed and arranged to:

send a response signal to the first array management function device of the first LAAG to report completion of block invalidation in response to the write invalidate command signal.

* * * * *